(12) United States Patent
Subramanian et al.

(10) Patent No.: US 9,127,155 B2
(45) Date of Patent: Sep. 8, 2015

(54) PHOSPHORUS FREE FLAME RETARDANT COMPOSITION

(75) Inventors: Muthulakshmi Rakkapillai Thangamuthupillai Subramanian, Bangalore (IN); Satish Nagarajachar, Bangalore (IN); Abbas Alli G. Shaikh, Bangalore (IN); Satish Kumar Mahanth, Bangalore (IN); Christiaan Henricus Johannes Koevoats, Roosendaal (NL); Subodhkumer Pal, Bangalore (IN); Vitthai Sawaent, Bangalore (IN); Rajashekar Totad, Bangalore (IN)

(73) Assignee: SABIC Global Technologies B.V., Bergen op Zoom (NL)

(*) Notice: Subject to any disclaimer, the term of this patent is extended or adjusted under 35 U.S.C. 154(b) by 0 days.

(21) Appl. No.: 13/444,553

(22) Filed: Apr. 11, 2012

(65) Prior Publication Data
US 2013/0274417 A1 Oct. 17, 2013

(51) Int. Cl.
C08L 69/00 (2006.01)
C08G 64/16 (2006.01)
C08G 77/26 (2006.01)
C08L 83/08 (2006.01)
C08L 71/02 (2006.01)

(52) U.S. Cl.
CPC .......... *C08L 69/00* (2013.01); *C08L 71/02* (2013.01)

(58) Field of Classification Search
USPC .................................. 525/63, 71, 93
See application file for complete search history.

(56) References Cited

U.S. PATENT DOCUMENTS

| | | | |
|---|---|---|---|
| 4,746,701 A | 5/1988 | Kress et al. | |
| 4,994,532 A | 2/1991 | Hawkins et al. | |
| 5,322,882 A | 6/1994 | Okamoto | |
| 5,455,310 A | 10/1995 | Hoover et al. | |
| 6,001,929 A | 12/1999 | Nodera et al. | |
| 6,451,906 B1 | 9/2002 | Saito et al. | |
| 6,462,111 B1 | 10/2002 | Singh et al. | |
| 6,576,706 B1 | 6/2003 | Nodera et al. | |
| 6,727,312 B1* | 4/2004 | Nodera | 524/451 |
| 6,825,266 B2 | 11/2004 | Taraiya et al. | |
| 7,786,246 B2 | 8/2010 | Jansen et al. | |
| 2002/0099116 A1 | 7/2002 | Nodera et al. | |
| 2003/0027928 A1 | 2/2003 | Okamoto et al. | |
| 2003/0191245 A1* | 10/2003 | Nodera et al. | 525/100 |
| 2004/0127635 A1* | 7/2004 | Taraiya et al. | 524/588 |
| 2004/0220330 A1 | 11/2004 | DeRudder et al. | |
| 2005/0228137 A1 | 10/2005 | Srinivasan et al. | |
| 2005/0261414 A1 | 11/2005 | Mitsuhashi et al. | |
| 2006/0148986 A1 | 7/2006 | Glasgow et al. | |
| 2007/0010619 A1 | 1/2007 | Chatterjee et al. | |
| 2007/0155857 A1* | 7/2007 | Lee et al. | 523/201 |
| 2008/0081884 A1 | 4/2008 | Glasgow et al. | |
| 2008/0081892 A1* | 4/2008 | Di et al. | 528/29 |
| 2009/0198010 A1* | 8/2009 | Eckel et al. | 524/451 |
| 2010/0075125 A1* | 3/2010 | Maas et al. | 428/220 |
| 2010/0157217 A1 | 6/2010 | Kim et al. | |
| 2014/0234629 A1* | 8/2014 | Sun et al. | 428/412 |
| 2014/0295363 A1* | 10/2014 | Sun et al. | 431/291 |

FOREIGN PATENT DOCUMENTS

| | | |
|---|---|---|
| CN | 1745144 A | 3/2006 |
| CN | 101796098 A | 8/2010 |
| EP | 425894 A2 | 5/1991 |
| EP | 1094093 A2 | 4/2001 |
| EP | 1277799 A1 | 1/2003 |
| WO | WO-8000084 A1 | 1/1980 |
| WO | WO 2013/049967 * | 4/2013 |
| WO | WO2013/067684 * | 5/2013 |

* cited by examiner

*Primary Examiner* — Jeffrey Mullis
(74) *Attorney, Agent, or Firm* — Baker & Hostetler LLP

(57) ABSTRACT

Phosphorus free polycarbonate compositions having flame retardant properties and a desirable balance of flow, impact resistance, and heat deflection properties are disclosed.

38 Claims, No Drawings

PHOSPHORUS FREE FLAME RETARDANT COMPOSITION

BACKGROUND

1. Technical Field

The present disclosure relates to flame retardant polycarbonate compositions, and specifically to phosphorus free flame retardant polycarbonate compositions.

2. Technical Background

To impart flame retardant properties to polycarbonate materials, phosphate based additives are frequently added to the polycarbonate resin. Organic phosphates, such as resorcinol diphosphate (RDP) or bisphenol-A diphosphate (BPADP) are frequently used as flame retardant additives in polycarbonates and polycarbonate/acrylonitrile-butadiene-styrene rubber (ABS) blends.

In addition to imparting flame retardant properties, these phosphate based additives can adversely affect other desirable properties of the polycarbonate material, such as, for example, melt flow, impact resistance, tensile modulus, and other long term mechanical properties. In addition, the use of phosphate based additives poses various health and environmental concerns.

Therefore, there is a need for flame retardant polycarbonate materials that do not contain phosphate based flame retardant additives, but that retains a desirable balance of physical properties, such as melt flow, impact resistance, tensile modulus, and heat deflection temperature. These needs and other needs are satisfied by the compositions and methods of the present disclosure.

SUMMARY

In accordance with the purpose(s) of the invention, as embodied and broadly described herein, this disclosure, in one aspect, relates to flame retardant polycarbonate compositions, and specifically to phosphorus free flame retardant polycarbonate compositions.

In one aspect, the present disclosure provides a polycarbonate composition having a V0 flame resistance rating at a thickness of at least 1.6 mm, according to UL94 standards, and one or more of the following: a melt volume rate of a polycarbonate component of at least about 16 cc/10 min, when measured at 260° C. and utilizing a 5 kg load; a notched IZOD impact value of at least 500 J/m; a heat deflection temperature at 1.8 MPa flatwise mode of at least 105° C.; wherein the composition is free of or substantially free of a phosphate additive.

In another aspect, the present disclosure provides a phosphate free, flame retardant polycarbonate composition comprising a polycarbonate having bisphenol A unit melt volume rate of from about 4 cc/10 min to about 14 cc/10 min, when measured at 300° C. and with a 1.2 kg load.

In another aspect, the present disclosure provides a phosphate free, flame retardant polycarbonate composition comprising a copolymer of 2-phenyl-3,3'-bis(4-hydroxyphenyl) phthalimide and bisphenol-A.

In another aspect, the present disclosure provides a phosphate free, flame retardant polycarbonate composition comprising a polycarbonate siloxane copolymer and/or a combination of a polycarbonate siloxane copolymer and a polycarbonate resin, wherein the siloxane content in the copolymer is from about 10% to about 30%.

In another aspect, the present disclosure provides a phosphate free, flame retardant polycarbonate composition comprising a poly(styrene-co-acrylonitrile) copolymer having a styrene content of about 75% and an acrylonitrile content of about 25%.

In another aspect, the present disclosure provides a phosphate free, flame retardant polycarbonate composition comprising polymethyl methacrylate grafted siloxane and acrylic rubber, wherein the siloxane content is from about 50% to about 75%.

In another aspect, the present disclosure provides a phosphate free, flame retardant polycarbonate composition comprising poly(tetrafluoroethane) encapsulated (72:28 w/w) styrene-acrylonitrile copolymer.

In another aspect, the present disclosure provides a phosphate free, flame retardant polycarbonate composition comprising a polyalkylene glycol having a molecular weight (Mn) of about 2000 g/mole.

In yet other aspects, the present disclosure provides an article comprising the phosphate free, flame retardant polycarbonate compositions described herein.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited.

DEFINITIONS

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, example methods and materials are now described.

As used in the specification and the appended claims, the singular forms "a," "an" and "the" include plural referents unless the context clearly dictates otherwise. Thus, for example, reference to "a ketone" includes mixtures of two or more ketones.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that the subsequently described event or circumstance can or can not occur, and that the description includes instances where said event or circumstance occurs and instances where it does not. For example, the phrase "optionally substituted alkyl" means that the alkyl group can or can not be substituted and that the description includes both substituted and unsubstituted alkyl groups.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight, of a particular element or component in a composition or article, denote the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —OCH$_2$CH$_2$O— units in the polyester, regardless of whether ethylene glycol was used to prepare the polyester. Similarly, a sebacic acid residue in a polyester refers to one or more —CO(CH$_2$)$_8$CO— moieties in the polyester, regardless of whether the residue is obtained by reacting sebacic acid or an ester thereof to obtain the polyester.

The term "alkyl group" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "alkoxy" as used herein is an alkyl group bound through a single, terminal ether linkage; that is, an "alkoxy" group can be defined as —OR where R is alkyl as defined above. A "lower alkoxy" group is an alkoxy group containing from one to six carbon atoms.

The term "alkenyl group" as used herein is a hydrocarbon group of from 2 to 24 carbon atoms and structural formula containing at least one carbon-carbon double bond. Asymmetric structures such as (AB)C=C(CD) are intended to include both the E and Z isomers. This can be presumed in structural formulae herein wherein an asymmetric alkene is present, or it can be explicitly indicated by the bond symbol C.

The term "alkynyl group" as used herein is a hydrocarbon group of 2 to 24 carbon atoms and a structural formula containing at least one carbon-carbon triple bond.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "cycloalkyl group" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl group" is a cycloalkyl group as defined above where at least one of the carbon atoms of the ring is substituted with a heteroatom such as, but not limited to, nitrogen, oxygen, sulphur, or phosphorus.

The term "aralkyl" as used herein is an aryl group having an alkyl, alkynyl, or alkenyl group as defined above attached to the aromatic group. An example of an aralkyl group is a benzyl group.

The term "hydroxyalkyl group" as used herein is an alkyl, alkenyl, alkynyl, aryl, aralkyl, cycloalkyl, halogenated alkyl, or heterocycloalkyl group described above that has at least one hydrogen atom substituted with a hydroxyl group.

The term "alkoxyalkyl group" is defined as an alkyl, alkenyl, alkynyl, aryl, aralkyl, cycloalkyl, halogenated alkyl, or heterocycloalkyl group described above that has at least one hydrogen atom substituted with an alkoxy group described above.

where R can be hydrogen, an alkyl, alkenyl, alkynyl, aryl, aralkyl, cycloalkyl, halogenated alkyl, or heterocycloalkyl group described above.

Unless specifically stated to the contrary, terms for components and materials used throughout the specification are listed in Table 1, below, together with a description and source.

TABLE 1

Raw Materials Used.

| Component | Supplier | Description |
|---|---|---|
| BPA PC-1 | SABIC Innovative Plastics | BPA polycarbonate resin made by the interfacial process with an MVR at 300° C./1.2 kg, of 5.1-6.9 g/10 min-high flow grade 175 (weight average molecular weight-41,725 using polystyrene standard). |
| Polycarbonate-polysiloxane copolymer | SABIC Innovative Plastics | Polycarbonate-polysiloxane copolymer comprising units derived from a formula (6) wherein 0, R2 is propylene, R is methyl, D has an average value of 50 and the copolymer has an absolute molecular weight of about 62750 (polystyrene standard) g/mole and dimethyl siloxane content of about 20%. |
| nitrile capped PC | SABIC Innovative Plastics | Branched Nitrile end capped polycarbonate having 3% branching and a weght average molecular weight of 48,260 (polystyrene standard) |
| BPADP | Supresta | Bisphenol A diphenyl phosphate |
| Metablen (SX005) | Mitsubishi Rayon Co., Ltd. | Core-shell impact modifier (core: silicone elastomer) & (shell: MMA copolymer) available under the tradename SX-005 |
| SAN | SABIC Innovative Plastics | Styrene-acrylonitrile copolymerwith 25% acrylonitrile content with the molecular weight of 60,000-1,10,000 (polystyrene standard) |
| PPPBP-BPAPC copolymer | SABIC Innovative Plastics | Copolymer of 2-phenyl-3,3'-bis(4-hydroxyphenyl) phthalimide (32 mol %) and bisphenol A (68 mol %) with a weight average molecular weight of 43,650 (polystyrene standard) |
| PETS | Ciba Specialty Chemicals | (pentaerythritol tetrastearate) |
| TSAN | SABIC Innovative Plastics | Polytetrafluoroethylene (PTFE) encapsulated by a styreneacrylonitrile copolymer (SAN) (anti-drip agent) |
| IRGANOX® 1010 | Ciba Specialty chemicals | Pentaerythritol Tetrakis(3-(3,5-di-tert-butyl-4-hydroxyphenyl)propionate) |

The term "ester" as used herein is represented by the formula —C(O)OA, where A can be an alkyl, halogenated alkyl, alkenyl, alkynyl, aryl, heteroaryl, cycloalkyl, cycloalkenyl, heterocycloalkyl, or heterocycloalkenyl group described above.

The term "carbonate group" as used herein is represented by the formula —OC(O)OR, where R can be hydrogen, an alkyl, alkenyl, alkynyl, aryl, aralkyl, cycloalkyl, halogenated alkyl, or heterocycloalkyl group described above.

The term "carboxylic acid" as used herein is represented by the formula —C(O)OH.

The term "aldehyde" as used herein is represented by the formula —C(O)H.

The term "keto group" as used herein is represented by the formula —C(O)R, where R is an alkyl, alkenyl, alkynyl, aryl, aralkyl, cycloalkyl, halogenated alkyl, or heterocycloalkyl group described above.

The term "carbonyl group" as used herein is represented by the formula C=O.

The term "ether" as used herein is represented by the formula AOA$^1$, where A and A$^1$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "sulfo-oxo group" as used herein is represented by the formulas —S(O)$_2$R, —OS(O)$_2$R, or, —OS(O)$_2$OR, Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

As briefly described above, the present disclosure provides polycarbonate materials having flame retardant properties, wherein the polycarbonate composition does not comprise a phosphate based flame retardant additive. While phosphate based additives can be effective flame retardants, they can adversely affect one or more physical properties of a polymer material. In addition, polymers based on phthalimide (a copolymer of 2-phenyl-3,3'-bis(4-hydroxyphenyl)phthalimide and bisphenol-A), can exhibit good flame retardant properties, but can suffer from poor flow properties. In another aspect, the polycarbonate does not comprise a polycarbonate derived from a 2-hydrocarbyl-3,3'-bis(4-hydroxyaryl)phthalimidine structural unit.

In one aspect, the polycarbonate composition of the present invention is free of or substantially free of phosphorus. In another aspect, the polycarbonate composition of the present invention is free of or substantially free of a phosphate based flame retardant additive. In another aspect, the polycarbonate composition of the present invention is free of or substantially free of phosphate. In yet another aspect, the polycarbonate composition is free of phosphate. In other aspects, the polycarbonate is free of or substantially free of a halogen based flame retardant. In still another aspect, the polycarbonate is free of or substantially free of chlorine and/or bromine. In one aspect, the phrase "substantially free of" is intended to refer to a small amount that does not adversely affect the desirable properties of the final composition. In one aspect, substantially free of can be less than about 0.5 wt. %. In another aspect, substantially free of can be less than about 0.1 wt. %. In another aspect, substantially free of can be less than about 0.01 wt. %. In yet another aspect, substantially free of can be less than about 100 ppm. In yet another aspect, substantially free can refer to an amount, if present at all, below a detectable level.

In another aspect, the flame retardant polycarbonate composition of the present invention has a desirable balance of physical properties, such as, for example, melt flow, impact resistance, tensile modulus, and heat deflection temperature. In one aspect, the flame retardant polycarbonate composition has desirable melt flow properties in addition to one or more of: impact resistance, tensile modulus, heat deflection temperature, and/or other properties.

Polycarbonate

In one aspect, the present disclosure provides a polycarbonate. In various aspects, the polycarbonate can have useful mechanical properties such as impact strength and transparency. In other aspects, the polycarbonate can optionally have low background color, good UV stability, and good molecular weight (Mw) stability. In still other aspects, all or a portion of the polycarbonate can be derived from or prepared from natural and/or renewable materials.

As used herein, the term "polycarbonate" includes homopolycarbonates and copolycarbonates have repeating structural carbonate units. In one aspect, a polycarbonate can comprise any polycarbonate material or mixture of materials as recited in U.S. Pat. No. 7,786,246, which is hereby incorporated in its entirety for the specific purpose of disclosing various polycarbonate compositions and methods.

In one aspect, a polycarbonate, as disclosed herein, can be an aliphatic-diol based polycarbonate. In another aspect, a polycarbonate can comprise a carbonate unit derived from a dihydroxy compound, such as for example a bisphenol that differs from the aliphatic diol.

In one aspect, non-limiting examples of suitable bisphenol compounds include the following: 4,4'-dihydroxybiphenyl, 1,6-dihydroxynaphthalene, 2,6-dihydroxynaphthalene, bis (4-hydroxyphenyl)methane, bis(4-hydroxyphenyl)diphenylmethane, bis(4-hydroxyphenyl)-1-naphthylmethane, 1,2-bis (4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis(hydroxyphenyl) cyclopentane, 1,1-bis(4-hydroxyphenyl)cyclohexane, 1,1-bis(4-hydroxy-3 methylphenyl)cyclohexane 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2, 2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy aromatic compounds.

In another aspect, exemplary bisphenol compounds can comprise 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine ("PPPBP"), and 9,9-bis(4-hydroxyphenyl)fluorene. Combinations comprising at least one dihydroxy aromatic compound can also be used. In another aspect, other types of diols can be present in the polycarbonate.

In yet another aspect, polycarbonates with branching groups are can be useful, provided that such branching does not significantly adversely affect desired properties of the polycarbonate. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl)alpha,alpha-dimethylbenzyl)phenol), 4-chloroformyl phthalic anhydride, trimesic acid, and benzophenone tetracarboxylic acid. In one aspect, a branching agent can be added at a level of about 0.05 to about 2.0 wt %. In still another aspect, mixtures comprising linear polycarbonates and branched polycarbonates can be used.

Polycarbonates can comprise copolymers comprising carbonate units and other types of polymer units, including ester units, and combinations comprising at least one of homopolycarbonates and copolycarbonates. An exemplary polycarbonate copolymer of this type is a polyester carbonate, also known as a polyester-polycarbonate.

In one aspect, an aliphatic-based polycarbonate comprises aliphatic units that are either aliphatic carbonate units derived from aliphatic diols, or a combination of aliphatic ester units derived from aliphatic diacids having greater than 13 carbons.

In one aspect, the molecular weight of any particular polycarbonate can be determined by, for example, gel permeation chromatography using universal calibration methods based on polystyrene (PS) standards. Generally polycarbonates can have a weight average molecular weight (Mw), of greater than about 5,000 g/mol based on PS standards. In one aspect, the polycarbonates can have an Mw of greater than or equal to about 39,000 g/mol, based on PS standards. In another aspect, the polycarbonates have an Mw based on PS standards of 39,000 to 100,000 g/mol, specifically 40,000 to 90,000 g/mol, more specifically 40,000 to 80,000 g/mol, and still more specifically 40,000 to 70,000 g/mol. In another aspect, the polycarbonates have an Mw based on polycarbonate (PC) standards of 20,000 to 70,000 g/mol, specifically 21,000 to 65,000 g/mol, more specifically 22,000 to 60,000 g/mol, and still more specifically 25,000 to 60,000 g/mol.

Molecular weight (Mw and Mn) as described herein, and polydispersity as calculated therefrom, can be determined using gel permeation chromatography (GPC), using a cross-linked styrene-divinylbenzene column, and either PS or PC standards as specified. GPC samples can be prepared in a solvent such as methylene chloride or chloroform at a concentration of about 1 mg/ml, and can be eluted at a flow rate of about 0.2 to 1.0 ml/min.

In one aspect, the glass transition temperature ($T_g$) of a polycarbonate can be less than or equal to 135° C. In another aspect, the glass transition temperature of a polycarbonate can be from about 85° C. to about 130° C., from about 90° C. to about 130° C., from about 90° C. to about 125° C., or from about 90° C. to about 120° C.

In another aspect, a polycarbonate component can have a melt viscosity rate (MVR) of at least about 30 cm³/10 minutes, for example, about 30, 32, 34, 36, 38, 40, 41, 44, 46, 48, 50 cm³/10 minutes or more, when measured at 260° C. with a 5 kg load.

In one aspect, polycarbonates can be manufactured using an interfacial phase transfer process or melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium such as for example methylene chloride, and contacting the reactants with a carbonate precursor (such as phosgene) in the presence of a catalyst such as, for example, triethylamine or a phase transfer catalyst salt, under controlled pH conditions of, for example, about 8 to about 10.

In one aspect, the composition further comprises a polycarbonate-polysiloxane copolymer comprising polycarbonate blocks and polydiorganosiloxane blocks. The polycarbonate blocks in the copolymer comprise repeating structural units of formula (1):

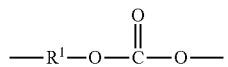  (1)

wherein $R^1$ comprises groups are aromatic organic radicals and the balance thereof are aliphatic, alicyclic or aromatic radicals. These units may be derived from reaction of dihydroxy compounds of formula (2):

HO-A¹-Y¹-A²-OH  (2)

wherein, in one aspect, the dihydroxy compound is bisphenol A, in which each of $A^1$ and $A^2$ is p-phenylene and $Y^1$ is isopropylidene.

In one aspect, the polydiorganosiloxane blocks comprise repeating structural units of formula (3) (sometimes referred to herein as 'siloxane'):

  (3)

wherein each occurrence of R can be the same or different, and is a $C_{1-13}$ monovalent organic radical. For example, R may be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. Combinations of the foregoing R groups can be used in the same copolymer.

In one aspect, the value of D in formula (3) can vary widely depending on the type and relative amount of each component in the thermoplastic composition, the desired properties of the composition, and like considerations. Generally, D can have an average value of 2 to about 1000, specifically about 2 to about 500, more specifically about 5 to about 100. In one embodiment, D has an average value of about 10 to about 75, and in still another embodiment, D has an average value of about 40 to about 60. Where D is of a lower value, e.g., less than about 40, it can be desirable to use a relatively larger amount of the polycarbonate-polysiloxane copolymer. Conversely, where D is of a higher value, e.g., greater than about 40, it can be desirable to use a relatively lower amount of the polycarbonate-polysiloxane copolymer.

In another aspect, a combination of a first and a second (or more) polycarbonate-polysiloxane copolymer can be used, wherein the average value of D of the first copolymer is less than the average value of D of the second copolymer.

In one aspect, the polydiorganosiloxane blocks are provided by repeating structural units of formula (4):

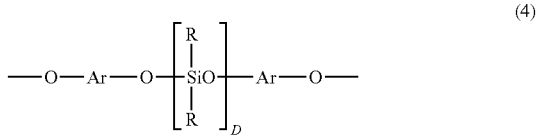  (4)

wherein D is as defined above; each R may be the same or different, and is as defined above; and Ar may be the same or different, and is a substituted or unsubstituted $C_6$-$C_{30}$ arylene radical, wherein the bonds are directly connected to an aromatic moiety. Suitable Ar groups in formula (4) can be derived from a $C_6$-$C_{30}$ dihydroxyarylene compound, for example a dihydroxyarylene compound of formula (3), (4), or (7) above. Combinations comprising at least one of the foregoing dihydroxyarylene compounds can also be used. Specific examples of suitable dihydroxyarlyene compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulphide), and 1,1-bis(4-hydroxy-t-butylphenyl)propane. Combinations comprising at least one of the foregoing dihydroxy compounds can also be used.

Such units can, in various aspects, be derived from the corresponding dihydroxy compound of the following formula (5):

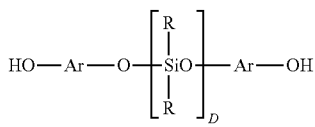

wherein Ar and D are as described above. Such compounds are further described in U.S. Pat. No. 4,746,701 to Kress et al., which is hereby incorporated by reference for the purpose of disclosing such compounds. Compounds of this formula can be obtained by the reaction of a dihydroxyarylene compound with, for example, an alpha, omega-bisacetoxypolydiorangonosiloxane under phase transfer conditions.

In another aspect, the polydiorganosiloxane blocks comprise repeating structural units of formula (6):

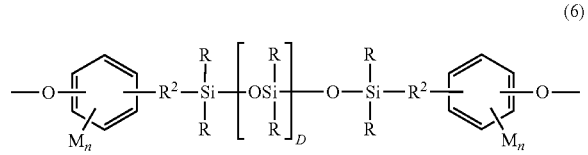

wherein R and D are as defined above; $R^2$ is a divalent $C_2$-$C_8$ aliphatic group; each M can be the same or different, and can be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4.

In one aspect, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$-$C_3$ aliphatic group, and R is methyl The polycarbonate can, in various aspects, be prepared by a melt polymerization process. Generally, in the melt polymerization process, polycarbonates are prepared by co-reacting, in a molten state, the dihydroxy reactant(s) and a diaryl carbonate ester, such as diphenyl carbonate, or more specifically in an aspect, an activated carbonate such as bis(methyl salicyl)carbonate, in the presence of a transesterification catalyst. The reaction can be carried out in typical polymerization equipment, such as one or more continuously stirred reactors (CSTRs), plug flow reactors, wire wetting fall polymerizers, free fall polymerizers, wiped film polymerizers, BANBURY® mixers, single or twin screw extruders, or combinations of the foregoing. In one aspect, volatile monohydric phenol can be removed from the molten reactants by distillation and the polymer is isolated as a molten residue. In another aspect, a useful melt process for making polycarbonates utilizes a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl)carboxylate, bis(4-acetylphenyl)carboxylate, or a combination comprising at least one of the foregoing.

The melt polymerization can include a transesterification catalyst comprising a first catalyst, also referred to herein as an alpha catalyst, comprising a metal cation and an anion. In one aspect, the cation is an alkali or alkaline earth metal comprising Li, Na, K, Cs, Rb, Mg, Ca, Ba, Sr, or a combination comprising at least one of the foregoing. The anion is hydroxide ($OH^-$), superoxide ($O^{2-}$), thiolate (HS), sulfide ($S^{2-}$), a $C_{1-20}$ alkoxide, a $C_{6-20}$ aryloxide, a $C_{1-20}$ carboxylate, a phosphate including biphosphate, a $C_{1-20}$ phosphonate, a sulfate including bisulfate, sulfites including bisulfites and metabisulfites, a $C_{1-20}$ sulfonate, a carbonate including bicarbonate, or a combination comprising at least one of the foregoing. In another aspect, salts of an organic acid comprising both alkaline earth metal ions and alkali metal ions can also be used. Salts of organic acids useful as catalysts are illustrated by alkali metal and alkaline earth metal salts of formic acid, acetic acid, stearic acid and ethyelenediamine tetraacetic acid. The catalyst can also comprise the salt of a non-volatile inorganic acid. By "nonvolatile", it is meant that the referenced compounds have no appreciable vapor pressure at ambient temperature and pressure. In particular, these compounds are not volatile at temperatures at which melt polymerizations of polycarbonate are typically conducted. The salts of nonvolatile acids are alkali metal salts of phosphites; alkaline earth metal salts of phosphites; alkali metal salts of phosphates; and alkaline earth metal salts of phosphates. Exemplary transesterification catalysts include, lithium hydroxide, sodium hydroxide, potassium hydroxide, cesium hydroxide, magnesium hydroxide, calcium hydroxide, barium hydroxide, lithium formate, sodium formate, potassium formate, cesium formate, lithium acetate, sodium acetate, potassium acetate, lithium carbonate, sodium carbonate, potassium carbonate, lithium methoxide, sodium methoxide, potassium methoxide, lithium ethoxide, sodium ethoxide, potassium ethoxide, lithium phenoxide, sodium phenoxide, potassium phenoxide, sodium sulfate, potassium sulfate, $NaH_2PO_3$, $NaH_2PO_4$, $Na_2H_2PO_3$, $KH_2PO_4$, $CsH_2PO_4$, $Cs_2H_2PO_4$, $Na_2SO_3$, $Na_2S_2O_5$, sodium mesylate, potassium mesylate, sodium tosylate, potassium tosylate, magnesium disodium ethylenediamine tetraacetate (EDTA magnesium disodium salt), or a combination comprising at least one of the foregoing. It will be understood that the foregoing list is exemplary and should not be considered as limited thereto. In one aspect, the transesterification catalyst is an alpha catalyst comprising an alkali or alkaline earth salt. In an exemplary aspect, the transesterification catalyst comprising sodium hydroxide, potassium hydroxide, sodium carbonate, potassium carbonate, sodium methoxide, potassium methoxide, $NaH_2PO_4$, or a combination comprising at least one of the foregoing.

The amount of alpha catalyst can vary widely according to the conditions of the melt polymerization, and can be about 0.001 to about 500 μmol. In an aspect, the amount of alpha catalyst can be about 0.01 to about 20 μmol, specifically about 0.1 to about 10 μmol, more specifically about 0.5 to about 9 μmol, and still more specifically about 1 to about 7 μmol, per mole of aliphatic diol and any other dihydroxy compound present in the melt polymerization.

In another aspect, a second transesterification catalyst, also referred to herein as a beta catalyst, can optionally be included in the melt polymerization process, provided that the inclusion of such a second transesterification catalyst does not significantly adversely affect the desirable properties of the polycarbonate. Exemplary transesterification catalysts can further include a combination of a phase transfer catalyst of formula $(R^3)_4Q^+X$ above, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalyst salts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl⁻, Br⁻, a $C_{1-8}$ alkoxy group or a $C_{6-18}$ aryloxy group. Examples of such transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing. Other melt transesterification catalysts include alkaline earth metal salts or alkali metal salts. In various aspects, where a beta catalyst is desired, the beta catalyst can be present in a molar ratio, relative to the alpha catalyst, of less than or equal to 10, specifically less than or equal to 5, more specifically less than or equal to 1, and still more specifically less than or equal to 0.5. In other aspects, the melt polymerization reaction disclosed herein uses only an alpha catalyst as described hereinabove, and is substantially free of any beta catalyst. As defined herein, "substantially free of" can mean where the beta catalyst has been excluded from the melt polymerization reaction. In one aspect, the beta catalyst is present in an amount of less than about 10 ppm, specifically less than 1 ppm, more specifically less than about 0.1 ppm, more specifically less than or equal to about 0.01 ppm, and more specifically less than or equal to about 0.001 ppm, based on the total weight of all components used in the melt polymerization reaction.

In one aspect, a melt process employing an activated carbonate is utilized. As used herein, the term "activated carbonate", is defined as a diarylcarbonate that is more reactive than diphenylcarbonate in transesterification reactions. Specific non-limiting examples of activated carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl)carbonate, bis(o-formylphenyl)carbonate.

Examples of specific ester-substituted diarylcarbonates include, but are not limited to, bis(methylsalicyl)carbonate (CAS Registry No. 82091-12-1) (also known as BMSC or bis(o-methoxycarbonylphenyl)carbonate), bis(ethylsalicyl)carbonate, bis(propylsalicyl)carbonate, bis(butylsalicyl)carbonate, bis(benzylsalicyl)carbonate, bis(methyl-4-chlorosalicyl)carbonate and the like. In one aspect, bis(methylsalicyl)carbonate is used as the activated carbonate in melt polycarbonate synthesis due to its lower molecular weight and higher vapor pressure.

Some non-limiting examples of non-activating groups which, when present in an ortho position, would not be expected to result in activated carbonates are alkyl, cycloalkyl or cyano groups. Some specific and non-limiting examples of non-activated carbonates are bis(o-methylphenyl)carbonate, bis(p-cumylphenyl)carbonate, bis(p-(1,1,3,3-tetramethyl)butylphenyl)carbonate and bis(o-cyanophenyl)carbonate. Unsymmetrical combinations of these structures can also be used as non-activated carbonates.

In one aspect, an end-capping agent (also referred to as a chain-stopper) can optionally be used to limit molecular weight growth rate, and so control molecular weight in the polycarbonate. Exemplary chain-stoppers include certain monophenolic compounds (i.e., phenyl compounds having a single free hydroxy group), monocarboxylic acid chlorides, and/or monochloroformates. Phenolic chain-stoppers are exemplified by phenol and $C_1$-$C_{22}$ alkyl-substituted phenols such as p-cumyl-phenol, resorcinol monobenzoate, and p- and tertiary-butyl phenol, cresol, and monoethers of diphenols, such as p-methoxyphenol. Alkyl-substituted phenols with branched chain alkyl substituents having 8 to 9 carbon atoms can be specifically mentioned. Certain monophenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

In another aspect, endgroups can be derived from the carbonyl source (i.e., the diaryl carbonate), from selection of monomer ratios, incomplete polymerization, chain scission, and the like, as well as any added end-capping groups, and can include derivatizable functional groups such as hydroxy groups, carboxylic acid groups, or the like. In one aspect, the endgroup of a polycarbonate can comprise a structural unit derived from a diaryl carbonate, where the structural unit can be an endgroup. In a further aspect, the endgroup is derived from an activated carbonate. Such endgroups can be derived from the transesterification reaction of the alkyl ester of an appropriately substituted activated carbonate, with a hydroxy group at the end of a polycarbonate polymer chain, under conditions in which the hydroxy group reacts with the ester carbonyl from the activated carbonate, instead of with the carbonate carbonyl of the activated carbonate. In this way, structural units derived from ester containing compounds or substructures derived from the activated carbonate and present in the melt polymerization reaction can form ester endgroups. In another aspect, the ester endgroup derived from a salicylic ester can be a residue of BMSC or other substituted or unsubstituted bis(alkyl salicyl)carbonate such as bis(ethyl salicyl)carbonate, bis(propyl salicyl)carbonate, bis(phenyl salicyl)carbonate, bis(benzyl salicyl)carbonate, or the like.

In one aspect, where a combination of alpha and beta catalysts are used in the melt polymerization, a polycarbonate polymer prepared from an activated carbonate can comprise endgroups in an amount of less than 2,000 ppm, less than 1,500 ppm, or less than 1,000 ppm, based on the weight of the polycarbonate. In another aspect, where only an alpha catalyst is used in the melt polymerization, a polycarbonate polymer prepared from an activated carbonate can comprise endgroups in an amount of less than or equal to 500 ppm, less than or equal to 400 ppm, less than or equal to 300 ppm, or less than or equal to 200 ppm, based on the weight of the polycarbonate.

In one aspect, the reactants for the polymerization reaction using an activated aromatic carbonate can be charged into a reactor either in the solid form or in the molten form. Initial charging of reactants into a reactor and subsequent mixing of these materials under reactive conditions for polymerization can be conducted in an inert gas atmosphere such as a nitrogen atmosphere. The charging of one or more reactants can also be done at a later stage of the polymerization reaction. Mixing of the reaction mixture is accomplished by any methods known in the art, such as by stirring. Reactive conditions include time, temperature, pressure and other factors that affect polymerization of the reactants. Typically the activated aromatic carbonate is added at a mole ratio of 0.8 to 1.3, and more preferably 0.9 to 1.3, and all subranges there between, relative to the total moles of monomer unit compounds (i.e., aromatic dihydroxy compound, and aliphatic diacid or diol). In a specific aspect, the molar ratio of activated aromatic carbonate to monomer unit compounds is 1.013 to 1.29, specifically 1.015 to 1.028. In another specific aspect, the activated aromatic carbonate is BMSC.

In one aspect, the melt polymerization reaction can be conducted by subjecting the reaction mixture to a series of temperature-pressure-time protocols. In some aspects, this involves gradually raising the reaction temperature in stages while gradually lowering the pressure in stages. In one aspect, the pressure is reduced from about atmospheric pressure at the start of the reaction to about 1 millibar (100 Pa) or lower, or in another aspect to 0.1 millibar (10 Pa) or lower in several steps as the reaction approaches completion. The temperature can be varied in a stepwise fashion beginning at a temperature of about the melting temperature of the reaction mixture and subsequently increased to final temperature. In one aspect, the reaction mixture is heated from room temperature to about 150° C. In such an aspect, the polymerization reaction starts at a temperature of about 150° C. to about 220° C. In another aspect, the polymerization temperature can be up to about 220° C. In other aspects, the polymerization reaction can then be increased to about 250° C. and then optionally further increased to a temperature of about 320° C., and all subranges there between. In one aspect, the total reaction time can be from about 30 minutes to about 200 minutes and all subranges there between. This procedure will generally ensure that the reactants react to give polycarbonates with the desired molecular weight, glass transition temperature and physical properties. The reaction proceeds to build the polycarbonate chain with production of ester-substituted alcohol by-product such as methyl salicylate. In one aspect, efficient removal of the by-product can be achieved by different techniques such as reducing the pressure. Generally the pressure starts relatively high in the beginning of the reaction and is lowered progressively throughout the reaction and temperature is raised throughout the reaction.

In one aspect, the progress of the reaction can be monitored by measuring the melt viscosity or the weight average molecular weight of the reaction mixture using techniques known in the art such as gel permeation chromatography. These properties can be measured by taking discrete samples or can be measured on-line. After the desired melt viscosity and/or molecular weight is reached, the final polycarbonate product can be isolated from the reactor in a solid or molten form. It will be appreciated by a person skilled in the art, that the method of making aliphatic homopolycarbonate and aliphatic-aromatic copolycarbonates as described in the preceding sections can be made in a batch or a continuous process and the process disclosed herein is preferably carried out in a solvent free mode. Reactors chosen should ideally be self-cleaning and should minimize any "hot spots." However, vented extruders similar to those that are commercially available can be used.

In one aspect, the aliphatic homopolycarbonate and aliphatic-aromatic copolycarbonate can be prepared in an extruder in presence of one or more catalysts, wherein the carbonating agent is an activated aromatic carbonate. In one aspect, the reactants for the polymerization reaction can be fed to the extruder in powder or molten form. In another aspect, the reactants are dry blended prior to addition to the extruder. The extruder can be equipped with pressure reducing devices (e.g., vents), which serve to remove the activated phenol by-product and thus drive the polymerization reaction toward completion. The molecular weight of the polycarbonate product can, in various aspects, be manipulated by controlling, among other factors, the feed rate of the reactants, the type of extruder, the extruder screw design and configuration, the residence time in the extruder, the reaction temperature and the pressure reducing techniques present on the extruder.

The molecular weight of the polycarbonate product can also depend upon the structures of the reactants, such as, activated aromatic carbonate, aliphatic diol, dihydroxy aromatic compound, and the catalyst employed. Many different screw designs and extruder configurations are commercially available that use single screws, double screws, vents, back flight and forward flight zones, seals, and sidestreams. One skilled in the art can find the best designs using generally known principals of commercial extruder design. Controlling the ratio diarylcarbonate/diol, specifically BMSC/diol can impact the Mw when using an activated carbonate. A lower ratio can generally give a higher molecular weight.

In one aspect, decomposition by-products of the reaction that are of low molecular weight can be removed by, for example, devolatilization during reaction and/or extrusion to reduce the amount of such volatile compounds. The volatiles typically removed can include unreacted starting diol materials, carbonate precursor materials, but are more specifically the decomposition products of the melt-polymerization reaction.

In other aspects, a polycarbonate composition can comprise one or more of an antioxidant, heat stabilizer, light stabilizer, UV absorbing additive, plasticizer, lubricant, mold release agent, antistatic agent, colorant (e.g., pigment and/or dye), or a combination thereof.

Thermoplastic compositions comprising the polycarbonate can be manufactured by various methods. For example, the polycarbonate and other polymers (if present), and/or other optional components are first blended, optionally with fillers in a HENSCHEL® high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a sidestuffer. Additives can also be compounded into a masterbatch with a desired polymeric resin and fed into the extruder. The extruder is generally operated at a temperature higher than that necessary to cause the composition to flow. The extrudate is immediately quenched in a water bath and pelletized. The pellets, so prepared, when cutting the extrudate can be one-fourth inch long or less as desired. Such pellets can be used for subsequent molding, shaping, or forming.

In various aspects, the homo and copolycarbonates can be used in making various articles including, but not limited to a film, a sheet, an optical wave guide, a display device and a light emitting diode prism. Furthermore the polycarbonates can be used in making articles such as, exterior body panels and parts for outdoor vehicles and devices including automobiles, protected graphics such as signs, outdoor enclosures such as telecommunication and electrical connection boxes, and construction applications such as roof sections, wall panels and glazing. Multilayer articles made of the disclosed polycarbonates particularly include articles which will be exposed to UV-light, whether natural or artificial, during their lifetimes, and most particularly outdoor articles; i.e., those intended for outdoor use. Suitable articles are exemplified by automotive, truck, military vehicle, and motorcycle exterior and interior components, including panels, quarter panels, rocker panels, trim, fenders, doors, decklids, trunklids, hoods, bonnets, roofs, bumpers, fascia, grilles, minor housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; lap-top computer housings; palm-held computer housings; monitor housings; printer housings; keyboards; facsimile machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications.

In another aspect, the polycarbonate material of the present invention can comprise a blend of polycarbonate and at least one other polymeric material. In one aspect, the polycarbonate itself can comprise a mixture or blend of polycarbonate materials In one aspect, the polycarbonate can comprise one or more other polymers, such as, for example, an acrylonitrile-butadiene-styrene. In another aspect, the one or more other polymeric materials mixed and/or blended with a polycarbonate can comprise a polymer system capable of maintaining and/or improving the heat deflection temperature of the resulting material. One of skill in the art, in possession of this disclosure, could readily select an appropriate polycarbonate and/or polycarbonate blend material.

Flame Retardant Polycarbonate Composition

The flame retardant polycarbonate composition of the present disclosure comprises from about 55 wt. % to about 80 wt. %, for example, about 55, 57, 59, 61, 63, 65, 67, 69, 71, 73, 75, 76, 77, 78, 79, or 80 wt. % of a BPA based polycarbonate; or from about 55 wt. % to about 75 wt. %, for example, about 55, 57, 59, 61, 63, 65, 67, 69, 71, 73, or 75 wt. % of a BPA based polycarbonate. In various aspects, the BPA based polycarbonate has a melt viscosity rate of from about 4 cm$^3$/10 minutes to about 14 cm$^3$/10 minutes, when measured at 300° C. with a 1.2 kg load.

In another aspect, the flame retardant polycarbonate composition can optionally comprise up to about 20 wt. %, for example, about 1, 3, 5, 7, 9, 11, 13, 15, 17, 19, or 20 wt. % of a PPPBP copolymer (copolymer of 2-phenyl-3,3'-bis(4-hydroxyphenyl)phthalimide and bisphenol-A. In one aspect, the polycarbonate composition does not comprise a PPPBP copolymer. In yet another aspect, the polycarbonate composition comprises a PPPBP.

In one aspect, a PPPBP copolymer can yield a char of about 40% in a nitrogen atmosphere and about 10% in an air atmosphere, whereas a BPAPC can yield a char of 22% in nitrogen and 2% in air at a temperature of 900° C. While not wishing to be bound by theory, it is believed that the higher char yield of PPPBP, as compared to BPAPC, corresponds to improved flame resistance.

In another aspect, the polycarbonate composition of the present disclosure can comprise a nitrile polycarbonate, such as, for example, nitrile capped BPA PC. In such an aspect, a nitrile polycarbonate component, if present can comprise up to about 20 wt. % of the composition, for example, about 1, 2, 3, 4, 5, 6, 7, 8, 9, 10, 12, 14, 16, 18, or 20 wt. %; or from about 5 wt. % to about 10 wt. % of the composition, for example, about 5, 6, 7, 8, 9, or wt. % of the composition. In still other aspects, a nitrile polycarbonate component, if present, can comprise greater than about 20 wt. % of the composition, and the present invention is not intended to be limited to any particular nitrile polycarbonate concentration.

In still another aspect, the flame retardant polycarbonate composition comprises from about 8 wt. % to about 18 wt. %, for example, about 8, 9, 10, 11, 12, 13, 14, 15, 16, 17, or 18 wt. % of a polycarbonate siloxane copolymer and/or a mixture of a polycarbonate siloxane copolymer and a polycarbonate resin. In one aspect, siloxane content in the copolymer can be from about 10 wt. % to about 30 wt. %. In still another aspect, the flame retardant polycarbonate composition comprises from about 10 wt. % to about 18 wt. %, for example, about 10, 11, 12, 13, 14, 15, 16, 17, or 18 wt. % of a polycarbonate siloxane copolymer and/or a mixture of a polycarbonate siloxane copolymer and a polycarbonate resin. In one aspect, siloxane content in the copolymer can be from about 10 wt. % to about 30 wt. %.

In yet another aspect, the flame retardant composition comprises up to about 5 wt. %, for example, about 0, 1, 2, 3, 4, or 4 wt. % of a poly(styrene-co-acrylonitrile). If present, such a poly(styrene-co-acrylonitrile) can have a styrene content of about 75 wt. %, for example, from about 60 wt. % to about 90 wt. %, and an acrylonitrile content of about 25 wt. %, for example, from about 10 wt. % to about 40 wt. %.

The polycarbonate of the present invention comprises one or more impact modifying agents, or impact modifiers. In another aspect, the flame retardant composition can optionally comprise up to about 5 wt. %, for example, 0, 1, 2, 3, 4, or 5 wt. % of a siloxane based impact modifier. In one aspect, if present the siloxane based impact modifier can comprise a polymethylmethacrylate grafted siloxane and acrylic rubber. In such an aspect, the siloxane content can be from about 50 wt. % to about 75 wt. %, for example, about 50, 52, 54, 56, 58, 60, 62, 64, 66, 68, 70, 72, 74, or 75 wt. % of the impact modifier.

In yet another aspect, an impact modifier can comprise a polysiloxane-polycarbonate copolymer, for example, comprising units derived from BPA and dimethylsiloxane. In another aspect, an impact modifier can comprise a core-shell impact modifier, such as, for example, a silicone-acrylic rubber compound (e.g., silicone elastomer core and MMA copolymer shell; METABLEN® SX005 impact modifier available from Mitsubishi Rayon Co., Ltd.). In yet another aspect, an impact modifier can comprise two or more individual impact modifying compounds, such as, for example, a polycarbonate-polysiloxane copolymer and METABLEN® impact modifier.

In other aspects, a specific amount of any one or more impact modifiers can vary, based on the remaining components in the system and desired properties of the resulting polymer. One of skill in the art, in possession of this disclosure, could readily select an appropriate amount of any one or more impact modifiers to use in a polymer composition. In various aspects, one or a combination of individual impact modifiers can be utilized.

In another aspect, the flame retardant polycarbonate composition can comprise up to about 0.5 wt. % of an anti-drip additive, such as, for example, a poly(tetrafluoroethane) encapsulated styrene-acrylonitrile copolymer (TSAN). In one aspect, the polycarbonate comprises up to about 0.5 wt. % of TSAN having a 72:28 w/w ratio.

In another aspect, the inventive polycarbonate composition can comprise one or more anti-drip agents. In various aspects, an anti-drip agent, if present, can comprise a fibril forming or non-fibril forming fluoropolymer, such as, for example, polytetrafluoroethylene (PTFE). In another aspect, an anti-drip agent, if present, can be encapsulated by a rigid copolymer, such as, for example, a styrene-acrylonitrile copolymer (SAN). In one aspect, the inventive polycarbonate composition comprises PTFE encapsulated in SAN (TSAN). In various aspects, encapsulated fluoropolymers can be made by polymerizing the encapsulating polymer in the presence of the fluoropolymer, for example, in an aqueous dispersion.

In one aspect, TSAN can provide significant advantages over PTFE, in that TSAN can be more readily dispersed in the composition. An exemplary TSAN can comprise about 50 wt % PTFE and about 50 wt % SAN, based on the total weight of the encapsulated fluoropolymer. The SAN can comprise, for example, about 75 wt % styrene and about 25 wt % acrylonitrile based on the total weight of the copolymer. Alternatively, the fluoropolymer can be pre-blended in some manner with a second polymer, such as for, example, an aromatic polycarbonate resin or SAN to form an agglomerated material for use as an anti-drip agent. Either method can be used to produce an encapsulated fluoropolymer.

Anti-drip agents are commercially available, and one of skill in the art, in possession of this disclosure, could readily select an appropriate anti-drip agent, if desired.

In still another aspect, the flame retardant polycarbonate composition can comprise up to about 5 wt. % of a poly(alkylene glycol). If present, such a poly(alkylene glycol) can have, in various aspects, a molecular weight (Mn) of about 2,000 g/mole, for example, from about 1,500 to about 2,500 g/mole. In other aspects, the poly(alkylene glycol), if present, can have a molecular weight higher than about 2,500 g/mole, for example, about 3,000, 4,000, 5,000, 6,000, 7,000, 8,000, 9,000, 10,000, or more.

In another aspect, the flame retardant polycarbonate composition comprises: from about 55 wt. % to about 75 wt. % of a BPA based polycarbonate, from about 0 wt. % to about 20 wt. % of PPPBP, from about 10 wt. % to about 18 wt. % of a polycarbonate-polysiloxane copolymer or a mixture thereof, up to about 5 wt. % SAN, up to about 5 wt. % of a siloxane based impact modifier, up to about 0.5 wt. % TSAN, and up to about 5 wt. % poly(alkylene glycol).

In another aspect, any siloxane component of the polycarbonate can be linear, cyclic, or a combination thereof. In one aspect, the siloxane is linear and/or branched, and the polycarbonate does not comprise a cyclic siloxane compound.

In another aspect, the inventive polycarbonate composition can comprise a filler, such as, for example, an inorganic filler. The specific composition of a filler, if present, can vary, provided that the filler is chemically compatible with the remaining components of the polycarbonate composition. If present, the amount of filler can comprise any amount suitable for a polycarbonate composition that does not adversely affect the desired properties thereof.

In another aspect, a filler, if present, can comprise silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents. In one aspect, the polycarbonate does not comprise a polyester.

In one aspect, a polycarbonate composition can comprise about 69.5 wt. % BPA-PC-1, about 9.5 wt. % polycarbonate-polysiloxane copolymer, about 2.8 wt. % SAN, about 13.9 wt. % PPPBP-PC, about 0.5 wt. % TSAN, about 0.3 wt. % PETS, about 0.3 wt. % IRGANOX® 1010 antioxidant, about 1.4 wt. % PEG, and about 1.9 wt. % Metablen SX-005 impact modifier. In another aspect, a polycarbonate composition can comprise about 66.8 wt. % BPA-PC-1, about 10.2 wt. % polycarbonate-polysiloxane copolymer, about 3 wt. % SAN, about 13.6 wt. % PPPBP-PC, about 0.5 wt. % TSAN, about 0.3 wt. % PETS, about 0.3 wt. % IRGANOX® 1010 antioxidant, about 1.4 wt. % PEG, and about 3.8 wt. % Metablen SX-005 impact modifier. In another aspect, a polycarbonate composition can comprise about 71.57 wt. % BPA-PC-1, about 12.89 wt. % polycarbonate-polysiloxane copolymer, about 1.14 wt. % SAN, about 10 wt. % PPPBP-PC, about 0.5 wt. % TSAN, about 0.3 wt. % PETS, about 0.3 wt. % IRGANOX® 1010 antioxidant, about 1.6 wt. % PEG, and about 2.14 wt. % Metablen SX-005 impact modifier.

In another aspect, a polycarbonate composition can comprise about 73.4 wt. % BPA-PC-1, about 14 wt. % polycarbonate-polysiloxane copolymer, about 2.5 wt. % SAN, about 5 wt. % nitrile capped BPA PC, about 1 wt. % TSAN, about 0.3 wt. % PETS, about 0.3 wt. % IRGANOX® 1010 antioxidant, about 1.5 wt. % PEG, and about 2 wt. % Metablen SX-005 impact modifier. In another aspect, a polycarbonate composition can comprise about 68.4 wt. % BPA-PC-1, about 14 wt. % polycarbonate-polysiloxane copolymer, about 2.5 wt. % SAN, about 10 wt. % nitrile capped BPA PC, about 1 wt. % TSAN, about 0.3 wt. % PETS, about 0.3 wt. % IRGANOX® 1010 antioxidant, about 1.5 wt. % PEG, and about 2 wt. % Metablen SX-005 impact modifier. In another aspect, a polycarbonate composition can comprise about 75.4 wt. % BPA-PC-1, about 14 wt. % polycarbonate-polysiloxane copolymer, about 1 wt. % SAN, about 5 wt. % nitrile capped BPA PC, about 0.5 wt. % TSAN, about 0.3 wt. % PETS, about 0.3 wt. % IRGANOX® 1010 antioxidant, about 1.5 wt. % PEG, and about 2 wt. % Metablen SX-005 impact modifier.

In other aspects, the inventive polycarbonate can comprise one or more other materials that can maintain and/or improve various properties of the resulting material. In various aspects, the inventive polycarbonate can comprise an epoxy, an anti-drip agent, filler, other additives, or a combination thereof. The polycarbonate can be transparent or have any degree of color and/or opacity as required for an intended application. Each of the materials recited herein as potential components of an inventive polycarbonate are commercially available and/or can be produced by those of skill in the art.

Properties of Improved Polycarbonate

In one aspect, the polycarbonate composition of the present disclosure can exhibit improved hydrostability and retention of notched IZOD impact performance after exposure to water for at least about 500 hours. The polycarbonate of the present disclosure, in various aspects, has a flame retardancy rating of V0 at a thickness of at least about 1.6 mm, according to UL94 standards. In another aspect, the polycarbonate has a V0 rating and one or more of: 1) a melt volume rate of at least about 16 cm$^3$/10 minutes, when measured at 260° C. and utilizing a 5 kg load; 2) a notched IZOD impact value of at least about 500 J/m; and/or 3) a heat deflection temperature of at least about 105° C. at 1.8 MPa in a flatwise mode. In another aspect, the polycarbonate exhibits a V0 rating and at least two of: 1) a melt volume rate of at least about 30 cm$^3$/10 minutes, when measured at 260° C. and utilizing a 5 kg load; 2) a notched IZOD impact value of at least about 500 J/m; and/or 3) a heat deflection temperature of at least about 105° C. at 1.8 MPa in a flatwise mode. In yet another aspect, the polycarbonate exhibits a V0 rating and each of: 1) a melt volume rate of at least about 30 cm$^3$/10 minutes, when measured at 260° C. and utilizing a 5 kg load; 2) a notched IZOD impact value of at least about 500 J/m; and 3) a heat deflection temperature of at least about 105° C. at 1.8 MPa in a flatwise mode.

In another aspect, the polycarbonate exhibits a melt volume ratio of at least about 16 cm$^3$/10 minutes, for example, about 16, 17, 18, 19, 20, 22, 24, 26, 28, 30, 32, 34, 36, 38, 40, 45, 50, or more cm$^3$/10 minutes, when measured at 260° C. with a 5 kg load; or at least about 30 cm$^3$/10 minutes, for example, about 30, 32, 34, 36, 38, 40, 45, 50, or more cm$^3$/10 minutes, when measured at 260° C. with a 5 kg load. In another aspect, the polycarbonate has a notched IZOD impact value of at least about 500 J/m, for example, about 500, 525, 550, 575, 600, 625, 650, 675, 700, 725, 750, 775, or 800 J/m. In yet another aspect, the polycarbonate has a heat deflection temperature of at least about 105° C., for example, about 105° C., 107° C., 109° C., 111° C., 113° C., 115° C., 117° C., 119° C., or more, at 1.8 MPa in a flatwise mode.

In another aspect, the polycarbonate composition can exhibit an improved Vicat softenting temperature (VST). The VST of a material is a measure of when a polymeric material begins to rapidly soften. In an exemplary test, according to ASTM D 1525 or ISI 306, a round, flat-ended needle of 1 mm$^2$ cross-section is placed on the surface of a test speciment under load, and the temperature raised at a uniform rate. The VST is the temperature at which the needle penetrates 1 mm into the material. In another aspect, the polycarbonate composition can exhibit a Vicat softening temperature of at least about 110° C., for example, about 110° C., 115° C., 120° C., 125° C., 130°, or 135° C. In yet another aspect, the polycarbonate composition can exhibit a VST of at least about 110° C., together with a heat deflection temperature of at least about 100° C. In yet another aspect, the polycarbonate composition can exhibit a VST of at least about 110° C., together with improved hydrostability.

In another aspect, the polycarbonate composition can exhibit improved retention of molecular weight and/or notched IZOD impact value after exposure to water for at least about 500 hours. In another aspect, the polycarbonate composition can exhibit improved processability as compared to conventional polycarbonate compositions.

Flame Retardancy

In one aspect, the flame retardancy of a polycarbonate material can be determined using standardized test criteria, such as, for example, UL 94 tests. Thin articles present a particular challenge in the UL 94 tests, because compositions suitable for the manufacture of thin articles tend to have a higher flow.

Shaped, formed, or molded articles comprising the thermoplastic compositions are also provided. The thermoplastic compositions can be molded into useful shaped articles by a variety of means such as injection molding, extrusion, rotational molding, blow molding and thermoforming to form articles such as, for example, computer and business machine housings such as housings for monitors, hand held electronic device housings such as housings for cell phones, electrical connectors, and components of lighting fixtures, ornaments, home appliances, roofs, greenhouses, sun rooms, swimming pool enclosures, and the like. The above-described compositions are of particular utility in the manufacture of articles comprising a minimum wall thickness of as low as about 0.1 mm, 0.5 mm, 1.0 mm, or 2.0 mm (about indicating ±10%). The above-described compositions are also of particular utility in the manufacture of articles comprising a minimum wall thickness of about 3 mm or less, e.g., about 0.1 mm to about 2 mm, e.g., about 1.2 mm to about 2 mm, or about 0.2 mm to about 1.8 mm or, more specifically, about 0.6 mm to about 1.5 mm or about 0.8 mm to about 1.2 mm.

Flammability tests were performed following the procedure of Underwriter's Laboratory Bulletin 94 entitled "Tests for Flammability of Plastic Materials for Parts in Devices and Appliances" According to this procedure, materials can be classified as HB, V0, UL94 V1, V2, 5VA, and/or 5VB on the basis of the test results obtained for five samples. The criteria for each of these flammability classifications are described below and elsewhere herein.

V0: In a sample placed so that its long axis is 180 degrees to the flame, the period of flaming and/or smoldering after removing the igniting flame does not exceed ten seconds and the vertically placed sample produces no drips of burning particles that ignite absorbent cotton.

V1: In a sample placed so that its long axis is 180 degrees to the flame, the period of flaming and/or smoldering after removing the igniting flame does not exceed thirty seconds and the vertically placed sample produces no drips of burning particles that ignite absorbent cotton.

V2: In a sample placed so that its long axis is 180 degrees to the flame, the average period of flaming and/or smoldering after removing the igniting flame does not exceed thirty seconds, but the vertically placed samples produce drips of burning particles that ignite cotton. Five bar flame out time is the sum of the flameout time for five bars, each lit twice for a maximum flame out time of 250 seconds.

5VB: a flame is applied to a vertically fastened, 5-inch (127 mm) by 0.5-inch (12.7 mm) test bar of a given thickness above a dry, absorbent cotton pad located 12 inches (305 mm) below the bar. The thickness of the test bar is determined by calipers with 0.1 mm accuracy. The flame is a 5-inch (125 mm) flame with an inner blue cone of 1.58 inches (40 mm). The flame is applied to the test bar for 5 seconds so that the tip of the blue cone touches the lower corner of the specimen. The flame is then removed for 5 seconds. Application and removal of the flame is repeated for until the specimen has had five applications of the same flame. After the fifth application of the flame is removed, a timer (T-0) is started and the time that the specimen continues to flame (after-flame time), as well as any time the specimen continues to glow after the after-flame goes out (after-glow time), is measured by stopping T-0 when the after-flame stops, unless there is an after-glow and then T-0 is stopped when the after-glow stops. The combined after-flame and after-glow time must be less than or equal to 60 seconds after five applications of a flame to a test bar, and there can be no drips that ignite the cotton pad. The test is repeated on 5 identical bar specimens. If there is a single specimen of the five does not comply with the time and/or no-drip requirements then a second set of 5 specimens are tested in the same fashion. All of the specimens in the second set of 5 specimens must comply with the requirements in order for material in the given thickness to achieve the 5VB standard.

Time to drip: The time to drip is determined by alternately applying and removing a flame as described for the 5VB test in consecutive 5-second intervals, until the first drip of material falls from the bar. A time to drip characteristic of 55 seconds (s) or greater has been found to correlate well with other desired characteristics such as 5VB ratings.

Flame retardancy can also be analyzed by calculation of the average flame out time, standard deviation of the flame out time, as the total number of drips, and using statistical methods to convert that data to a prediction of the probability of first time pass, or "pFTP", that a particular sample formulation would achieve a V0 "pass" rating in the conventional UL94 testing of 5 bars. Preferably pFTP will be as close to 1 as possible, for example greater than 0.9 and more preferably greater than 0.95, for maximum flame-retardant performance in UL testing. A pFTP of 0.85 or greater is deemed to be successful.

While typical aspects have been set forth for the purpose of illustration, the foregoing descriptions should not be deemed to be a limitation on the scope of the invention. Accordingly, various modifications, adaptations, and alternatives can occur to one skilled in the art without departing from the spirit and scope of the present invention.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

For each of the following examples, raw materials were weighed and mixed in a high speed mixer at 1,000 to 3,000 rpm for a period of from 90 seconds to 120 seconds. The components were then compounded in a 25 mm co-rotating Werner & Pfleiderer twin screw extruder at 270° C. with a rate of 15 kg/hr, a vacuum of 25 inches of mercury, and a screw speed of 300 rpm. The resulting extrudate was cooled under water and pelletized. The pellets were dried at 80° C. for 4 hours before injection molding in a thermostat oven. For the fabrication of individual test specimens, dried pellets were injection molded at 275° C., using a L&T 60T injection molding apparatus having a screw clamping capacity of 60 tons, a diameter of 25 mm, a shot capacity of 58 grams of polystyrene, and a screw speed of 100 rpm. Barrel zones were electrically heated and maintained at a temperature of from 230° C. to 265° C. The mold was maintained at a temperature of 80° C. using an oil heated temperature controller.

The molecular weight of polymers, including Mn, Mw, and polydispersity, were determined with gel permeation chromatography using a cross-linked styrene-divinylbenzene column, a sample concentration of about 1 mg/ml, and an elution rate (chloroform eluent) of from 0.5 ml/min to 1.5 ml/min.

For melt volumetric flow rate (MVR) analysis, samples were conditioned for 48 hours at 23° C. and 50% relative humidity prior to testing. MVR was measured according to ISO 1133 testing procedures using a Gotterfert Make Melt Volumetric Flow/Melt Flow Rate testing machine. Each sample was dried for a minimum of 3 hours at 120° C. in a hot air circulated oven. Testing conditions included a barrel temperature of 260° C., a load of 2.16 kg or 5 kg, and a pre-heating time of 300 seconds. The resulting MVR data is reported as cub centimeters (cc) per 10 minutes.

Notched Izod impact (NII) strength was performed according to ASTM D256 procedures. Analysis was performed on at least five bars for each formulation, using a Ceast instrument with a 2.75 J hammer.

The flammability of each test bar was also determined using UL94 flame testing procedures in a closed chamber (Atlas HVUL cabinet) and with a methane gas supply. Samples were conditioned for 48 hours at 23° C. and 50% relative humidity prior to testing. The flammability of each formulation was determined for both 2 mm and 1.6 mm thick bars, and the average flameout time for at least five bars was determined.

Hydroaging studies were performed at 75° C. and 90% relative humidity using a Tenney humidity control oven from Thermal Product Solutions.

1. Analysis of Phosphate Free Compositions

In a first example, several comparative and inventive samples were prepared using PPPBP copolymer as a flame retardant additive, metablen and/or polycarbonate-polysiloxane copolymer as an impact modifier, PEG and/or SAN as a flow promoter, and TSAN as an anti-drip agent. The details of each sample are listed in Table 2, below. Similarly, Table 3 details comparative and inventive samples prepared using nitrile polycarbonate (nitrile capped BPA PC).

TABLE 2

PEG + Metablen for FR-Impact Flow Balance

| Formulation | Comp. A | Comp. B | Inventive A | Inventive B | Inventive C |
|---|---|---|---|---|---|
| BPA-PC 2 | 68.5 | 70.5 | 69.5 | 66.8 | 71.57 |
| Polysiloxane-BPA PC copolymer | | 10.8 | 9.5 | 10.2 | 12.89 |
| SAN | | 3.2 | 2.8 | 3 | 1.14 |
| PPPBP-BPA PC copolymer | | 14.4 | 13.9 | 13.6 | 10 |
| TSAN | 0.7 | 0.5 | 0.5 | 0.5 | 0.5 |
| PETS | 0.3 | 0.3 | 0.3 | 0.3 | 0.3 |
| 1010 | 0.3 | 0.3 | 0.3 | 0.3 | 0.3 |
| BABS | 18 | | | | |
| PEG | | | 1.4 | 1.4 | 1.16 |
| Metablen SX-005 | | | 1.9 | 3.8 | 2.14 |
| BPADP | 12.2 | | | | |
| Total (%) | 100 | 100 | 100 | 100 | 100 |
| UL 94 V0 (mm) | 1.5 | 1 | 1.6 | 1.6 | 1.6 |
| MVR 260/5 kg (cc/10 min) | 38 | 16 | 35.97 | 34.64 | 32.5 |
| NII ASTM (J/m) | 550 | 800 | 578 | 535 | 570 |
| HDT | 80-90 | 112 | 112.9 | 113.2 | 106 |
| VICAT B120 (° C.) | 107 | 142 | >135 | >135 | |

The properties of the inventive samples A and B were compared to a commercially available control formulation and a comparative example. The inventive samples exhibited a V0 rating at 1.6 mm, MVR flow values of 34-36 cc/10 min (260° C., 5 kg load), and ductile failure at room temperature. The NII strength of the inventive samples was about 550 J/m without any phosphate additive. Each of the inventive samples also exhibited good heat resistance, having a Vicat softening temperature greater than 135° C. and a HDT above 100° C. The molecular weight of the inventive samples ranged from about 34,000 g/mole to about 37,000 g/mole.

TABLE 3 nitrile capped BPA PC Samples

| | Comparative A | Comparative C | Inventive D | Inventive E | Inventive F |
|---|---|---|---|---|---|
| BPA-PC 1 | 68.5 | 74.4 | 73.4 | 68.4 | 75.4 |
| polysiloxane-BPA PC copolymer | | 14.0 | 14.0 | 14.0 | 14.0 |
| SAN | | 5.0 | 2.5 | 2.5 | 1.0 |
| nitrile capped BPA PC | | 5.0 | 5.0 | 10.0 | 5.0 |
| TSAN | 0.70 | 1.00 | 1.00 | 1.00 | 0.50 |
| PETS | 0.30 | 0.30 | 0.30 | 0.30 | 0.30 |
| Irganox 1010 | 0.30 | 0.30 | 0.30 | 0.30 | 0.30 |
| BABS | 18.00 | | | | |
| PEG | | | 1.50 | 1.50 | 1.50 |
| Metablen SX005 | | | 2.00 | 2.00 | 2.00 |
| BPADP | 12.20 | | | | |
| Total | 100.0 | 100.0 | 100.0 | 100.0 | 100.0 |
| Properties | | | | | |
| UL94 V0 (mm) | 1.6 | 2 | 1.6 | 1.6 | 1.6 |
| MVR 260 C/5 Kg (cc/10 min) | 38 | 18.1 | 25.8 | 24.8 | 28.0 |
| NII, ASTM (J/m) | 550.0 | 651.9 | 637.1 | 626.3 | 584.0 |
| VICAT B120C (° C.) | | >130 | >130 | >130 | >130 |

2. Hydrostability

In a second example, comparative and inventive samples were prepared as detailed in Table 4, below, and subjected to hydrostability testing. The inventive example shows excellent retention of NII and MW after 500 hours of hydroageing compared to comparative A example.

TABLE 4

Hydrostability

| Formulation | Comparative A | Inventive F | Inventive C |
|---|---|---|---|
| BPA-PC 1 | 68.5 | 75.4 | 71.57 |
| polysiloxane-BPA PC copolymer | | 14.0 | 12.89 |
| SAN | | 1.0 | 1.14 |
| nitrile capped BPA PC | | 5.0 | |
| PPPBP-BPA PC copolymer | | | 10 |
| TSAN | 0.7 | 0.5 | 0.5 |
| PETS | 0.3 | 0.3 | 0.3 |
| 1010 | 0.3 | 0.3 | 0.3 |
| BABS | 18.0 | | |
| PEG | | 1.5 | 1.16 |
| Metablen SX-005 | | 2.0 | 2.14 |
| BPADP | | | |
| Properties | | | |
| Tensile Strength | | | |
| Exposure time (h) | | | |
| 0 | | 62.0 | 56.0 |
| 250 | | 70.0 | 64.0 |
| 500 | | 20 | 64 |
| 750 | Deformed | | 65 |
| Impact Strength (KJ/m2) Izod, Notched@ 4 mm | | | |
| Exposure time (h) | | | |
| 0 | | 14.5 | 50.0 |
| 250 | | 10.0 | 37.0 |
| 500 | | 4 | 33 |
| 750 | Deformed | | 27 |
| Impact Strength (J/m) Izod, Unnotched | | | |
| Exposure time (h) | | | |
| 0 | 550 | | 570 |
| 523 | 27 | | 455 |
| Molecular Wt (Mw) | | | |
| 0 | 45664 | 39741 | 35563 |

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A polycarbonate composition having two or more of the following:
   (a) a melt volume rate of a polycarbonate component of at least about 16 cc/10 min, when measured at 260° C. and utilizing a 5 kg load;
   (b) a notched Izod impact value of at least about 500 J/m; or
   (c) a heat deflection temperature at 1.8 MPa flatwise mode of at least about 105° C.;
   wherein the polycarbonate composition is free of a phosphorus based additive, wherein the polycarbonate composition is free of bromine; and wherein the polycarbonate composition comprises one or more of a nitrile polycarbonate, a phthalimide copolymer, or a combination thereof; and one or more of (i) a polymethyl methacrylate grafted silicone having a siloxane content from about 50 weight % to about 75 wt % and acrylic rubber, or (ii) a polyalkylene glycol having a molecular weight (Mn) of about 2,000 g/mol; and wherein the polycarbonate composition has a flame resistance rating of V0 when measured at 1.6 mm thickness, according to UL94 standards.

2. The polycarbonate composition of claim 1, having a, b, and c.

3. The polycarbonate composition of claim 1, having a melt volume rate of the polycarbonate component of at least about 30/cc. 10 min, when measured at 260° C. and utilizing a 5 kg load.

4. The polycarbonate composition of claim 1, having a notched Izod impact value of at least about 600 J/m.

5. The polycarbonate composition of claim 1, having a melt volume rate of the polycarbonate component of at least about 30 cc/10 min, when measured at 260° C. and utilizing a 5 kg load, and at least one of b and c.

6. The polycarbonate composition of claim 1, wherein a polycarbonate component has a melt volume rate of from about 4 cc/10 min to about 14 cc/10 min, when measured at 300° C. with a 1.2 kg load.

7. The polycarbonate composition of claim 6, wherein the polycarbonate component has from about 55 wt. % to about 80 wt. % of a bisphenol A-based polycarbonate.

8. The polycarbonate composition of claim 1, wherein the phthalimide copolymer comprises a copolymer of 2-phenyl-3,3'-bis(4-hydroxyphenyl)phthalimide and bisphenol-A.

9. The polycarbonate composition of claim 8, wherein the phthalimide copolymer comprises up to about 20 wt. % of 2-phenyl-3,3'-bis(4-hydroxyphenyl)phthalimide and bisphenol-A copolymer.

10. The polycarbonate composition of claim 1, comprising a polycarbonate siloxane copolymer and/or a combination of a polycarbonate siloxane copolymer and a polycarbonate resin, wherein the siloxane content in the copolymer is from about 10 wt. % to about 30 wt. %.

11. The polycarbonate composition of claim 10, wherein the siloxane content in the copolymer is from about 8 wt. % to about 18 wt. %.

12. The polycarbonate composition of claim 1, comprising a poly(styrene-co-acrylonitrile) copolymer having a styrene content of about 75 wt. % and an acrylonitrile content of about 25 wt. %.

13. The polycarbonate composition of claim 12 having up to about 5 wt. % of the poly(styrene-co-acrylonitrile) copolymer.

14. The polycarbonate composition of claim 1, having up to about 5 wt. % of a siloxane based impact modifier.

15. The polycarbonate composition of claim 1, comprising polytetrafluoroethylene encapsulated (72:28 w/w) styrene-acrylonitrile copolymer.

16. The polycarbonate composition of claim 15 having up to about 0.5 wt. % of the polytetrafluoroethylene encapsulated (72:28 w/w) styrene-acrylonitrile copolymer.

17. The polycarbonate composition of claim 1, wherein the polyalkylene glycol comprises polyethylene glycol.

18. The polycarbonate composition of claim 1, wherein the nitrile polycarbonate comprises from about 5 wt. % to about 10 wt. % of the composition.

19. The polycarbonate composition of claim 1, having a Vicat softening temperature of at least about 110° C. and a heat deflection temperature of at least about 100° C.

20. The polycarbonate composition of claim 1, having a Vicat softening temperature of at least about 110° C. and having greater than 4 KJ/m² notched Izod impact strength at 4 after exposure to water for about 500 hours.

21. The polycarbonate composition of claim 1, having improved retention of molecular weight and notched Izod impact strength after exposure to water for at least about 500 hours.

22. The polycarbonate composition of claim 1, having a melt volume rate of at least about 34 cc/10 min, when measured at 260° C. and utilizing a 5 kg load.

23. An article comprising the polycarbonate composition of claim 1.

24. An article comprising the polycarbonate composition of claim 6.

25. An article comprising the polycarbonate composition of claim 3.

26. An article comprising up to about 5 wt. % of the polycarbonate composition of claim 1.

27. A polycarbonate composition comprising:
(a) from about 55 wt. % to about 80 wt. % of a bisphenol A based polycarbonate having a melt viscosity rate of from about 4 cc to about 14 cc/10 min when measured at 300° C. with a 1.2 kg load;
(b) at least one of from greater than 0 wt. % to about 20 wt. % of a phenyl-3,3-bis(4-hydroxyphenyl)phthalimidine (PPPBP) copolymer and/or from greater than 0 wt. % to about 20 wt. % of a nitrile capped bisphenol A based polycarbonate;
(c) from about 8 wt. % to about 18 wt. % of a polycarbonate siloxane copolymer and/or a mixture thereof, wherein the siloxane content in the copolymer is from about 10 wt. % to about 30 wt. %;
(d) from 0 wt. % to about 5 wt. % of a poly(styrene-co-acrylonitrile) having a styrene content of about 75% and an acrylonitrile content of about 25 wt. %;
(e) from 0.5 wt. % to about 5 wt. % of a siloxane based impact modifier with polymethyl methacrylate grafted siloxane and acrylic rubber having a siloxane content of from about 50% to about 75%;
(f) from 0 wt. % to about 0.5 wt. % of a polytetrafluoroethylene encapsulated styrene-acrylonitrile copolymer (72:28 w/w); and
(g) from 0.5 wt. % to about 5 wt. % of a poly(alkylene glycol).

28. The polycarbonate composition of claim 27, wherein a) comprises from about 55 wt. % to about 75 wt. % of a bisphenol A based polycarbonate having a melt viscosity rate of from about 4 cc to about 14 cc/10 min when measured at 300° C. with a 1.2 kg load.

29. The polycarbonate composition of claim 27, wherein b) comprises from greater than 0 wt. % to about 20 wt. % of a 2-phenyl-3,3-bis(4-hydroxyphenyl)phthalimidine (PPPBP)-bisphenol A (BPA) polycarbonate copolymer.

30. The polycarbonate composition of claim 27, wherein b) comprises from greater than 0 wt. % to about 20 wt. % of a nitrile capped bisphenol A based polycarbonate.

31. The polycarbonate composition of claim 27, wherein b) comprises from about 5 wt. % to about 10 wt. % of a nitrile capped bisphenol A based polycarbonate.

32. The polycarbonate composition of claim 27, being free of phosphorus based additive.

33. The polycarbonate composition of claim 27, having less than about 0.1 wt. % phosphorus based additive.

34. The polycarbonate composition of claim 27, having less than about 100 ppm phosphorus based additive.

35. The polycarbonate composition of claim 27, having less than about 0.5 wt. % of a phosphate additive.

36. The polycarbonate composition of claim 27, being free of bromine.

37. A polycarbonate composition having two or more of the following:
(a) a melt volume rate of a polycarbonate component of at least about 16 cc/10 min, when measured at 260° C. and utilizing a 5 kg load;
(b) a notched Izod impact value of at least 500 J/m; or
(c) a heat deflection temperature of 1.8 MPa flatwise mode of at least 105° C.;
wherein the polycarbonate composition is free of a flame retardant additive comprising phosphorous or bromine and wherein the polycarbonate composition further comprises one or more of a nitrile polycarbonate, a phthalimide copolymer, or a combination thereof; and one or more of (i) a polymethyl methacrylate grafted silicone having a siloxane content from about 50 weight % to about 75 wt % and acrylic rubber, or (ii) a polyalkylene glycol having a molecular weight (Mn) of about 2,000 g/mol, and wherein the polycarbonate composition has a flame resistance rating of V0 when measured at 1.6 mm thickness according to UL94 standards.

38. A polycarbonate composition having two or more of the following:
(a) a melt volume rate of a polycarbonate component of at least about 16 cc/10 min, when measured at 260° C. and utilizing a 5 kg load;
(b) a notched Izod impact value of at least 500 J/m; or
(c) a heat deflection temperature of 1.8 MPa flatwise mode of at least 105° C.;
wherein the polycarbonate composition is free of a resorcinol 1,3-diphenylphosphate and bisphenol A bis(diphenyl)phosphate and bromine; and wherein the polycarbonate composition further comprises one or more of a nitrile polycarbonate, a phthalimide copolymer, or a combination thereof; and one or more of (i) a polymethyl methacrylate grafted silicone having a siloxane content from about 50 weight % to about 75 wt % and acrylic rubber, or (ii) a polyalkylene glycol having a molecular weight (Mn) of about 2,000 g/mol, and wherein the polycarbonate composition has a flame resistance rating of V0 when measured at 1.6 mm thickness according to UL94 standards.

* * * * *